(12) United States Patent
Carmichael

(10) Patent No.: US 11,767,089 B2
(45) Date of Patent: Sep. 26, 2023

(54) SYSTEM FOR ADJUSTING PRESSURE LIMITS BASED ON DEPTH OF THE DIVER(S)

(71) Applicant: BROWNIE'S MARINE GROUP, Pompano Beach, FL (US)

(72) Inventor: Blake Carmichael, Pompano Beach, FL (US)

(73) Assignee: BROWNIE'S MARINE GROUP, INC, Pompano Beach, FL (US)

(*) Notice: Subject to any disclaimer, the term of this patent is extended or adjusted under 35 U.S.C. 154(b) by 11 days.

(21) Appl. No.: 17/389,648

(22) Filed: Jul. 30, 2021

(65) Prior Publication Data

US 2022/0017191 A1     Jan. 20, 2022

Related U.S. Application Data

(63) Continuation of application No. 16/359,542, filed on Mar. 20, 2019, now Pat. No. 11,077,924.

(60) Provisional application No. 62/646,360, filed on Mar. 21, 2018.

(51) Int. Cl.
| | | |
|---|---|---|
| *B63C 11/22* | (2006.01) | |
| *F17C 13/02* | (2006.01) | |
| *G01L 19/16* | (2006.01) | |
| *H01H 19/18* | (2006.01) | |
| *G01L 19/08* | (2006.01) | |

(52) U.S. Cl.
CPC ............ *B63C 11/22* (2013.01); *F17C 13/025* (2013.01); *G01L 19/083* (2013.01); *G01L 19/16* (2013.01); *H01H 19/18* (2013.01); *F17C 2221/011* (2013.01); *F17C 2250/032* (2013.01); *F17C 2270/0781* (2013.01)

(58) Field of Classification Search
CPC .. B63C 11/22; F17C 13/025; F17C 2221/011; F17C 2270/0781
See application file for complete search history.

(56) References Cited

U.S. PATENT DOCUMENTS 11,077,924 B1 *  8/2021  Carmichael ............. B63C 11/22
11,225,309 B2 *  1/2022  Colborn ............... B63C 11/2227

* cited by examiner

*Primary Examiner* — Timothy L Maust
(74) *Attorney, Agent, or Firm* — Daniel S. Polley, P.A.

(57) ABSTRACT

A depth selector or current depth provider for use by a variable speed air system. As a depth selector it is preferably in the form of a rotary switch on the user interface for the air system. The rotary switch can have 3 positions for maximum depth selections, such as, without limitation 15, 25, and 65 feet. Other depth values and number of depth selections provided can be used and all are considered within the scope of the disclosure. A microcontroller of the system reads the voltage from the voltage divider created by the rotary switch selection to determine which position the rotary switch is in. The microcontroller uses this information to set the upper and lower pressure limits for the dive.

18 Claims, 3 Drawing Sheets

Rotary Switch Schematic

Depth Settings:
1. 15 feet
2. 25 feet
3. 65 feet
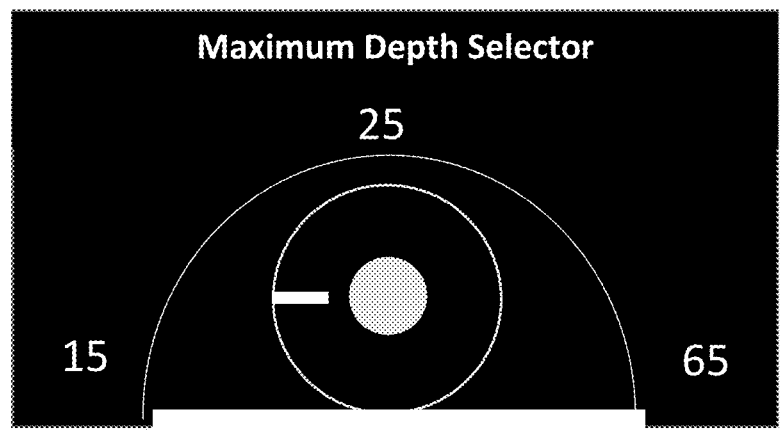
Figure 1: Rotary Switch Interface

- One pulse: 15 feet    Two pulses: 25 feet    Three pulses: 65 feet
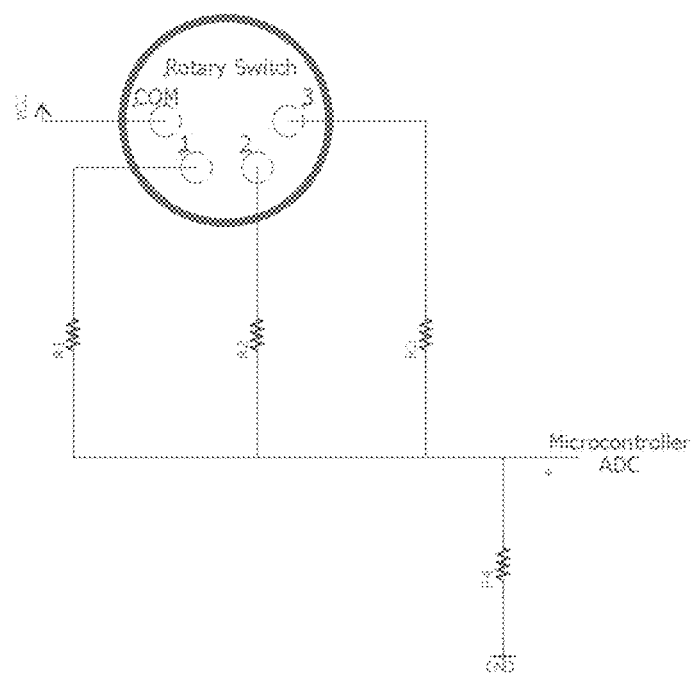
Figure 2: Rotary Switch Schematic One non-limiting way to do this is to mount the depth sensor in the diver's regulator.
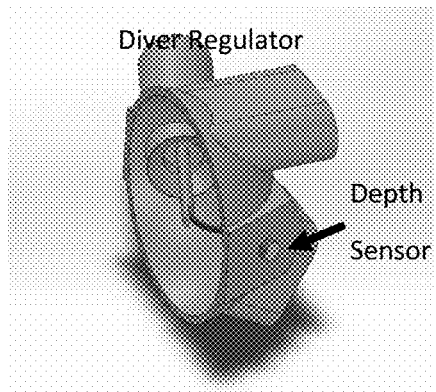
Figure 3: Depth Sensor in Regulator

SYSTEM FOR ADJUSTING PRESSURE LIMITS BASED ON DEPTH OF THE DIVER(S)

This application is a continuation of U.S. application Ser. No. 16/359,542, filed Mar. 20, 2019, which claims the benefit of and priority to U.S. Provisional Patent Application Ser. No. 62/646,360, filed Mar. 21, 2018. Both of the above applications are incorporated by reference in their entireties for all purposes.

FIELD OF THE DISCLOSURE

The disclosure relates generally to underwater activities and more particularly to hookah or surface supplied air systems for underwater activities.

BACKGROUND

Standard hookah systems, including the previous versions of Brownie's Third Lung VS, which are all incorporated by reference, are designed for a maximum depth rating and therefore operate with a specific air pressure limit. The deeper the depth rating, the higher pressure is required. For every 33 feet of seawater, an additional 14.7 PSI of air pressure from the compressor is required to overcome the increase in atmospheric pressure. There are also requirements to overcome regulators and such, but those will be ignored for the sake of simplicity and for the description of this novel system described below. At higher air pressures, the compressor is working harder to deliver air and is consuming more energy. Therefore, in theory, for a diver at 33 feet, any air pressure above 14.7 PSI is wasted energy (not accounting for variables other than atmospheric pressure.)

SUMMARY OF THE DISCLOSURE

The disclosed novel system can be preferably configured/designed to vary its pressure limit based on each specific dive. If the user is diving at a shallower depth, the system can operate at a lower pressure and therefore consume less power. In a non-limiting example or specific situation, the above noted VS ("variable speed") systems can be capable of supporting divers with a maximum depth up to 65 feet in a preferred embodiment. If the user is planning on diving with 2 divers at only 15 feet, with the disclosed novel system, the user can select the 15 feet as a maximum depth and gain upwards of about or approximately 50% more run time when compared with the standard control algorithm.

BRIEF DESCRIPTION OF THE DRAWINGS

FIG. 1 is a non-limiting embodiment for a rotary switch interface in accordance with the present disclosure;

FIG. 2 is a non-limiting embodiment for a rotary switch schematic in accordance with the present disclosure; and FIG. 3 is a non-limiting embodiment showing depth sensor mounted within a diver's regulator in accordance with the present disclosure.

DETAILED DESCRIPTION

In one non-limiting embodiment, a Brownies Third Lung VS/Sea Lion surface supplied air system can be selected for use underwater, and which can be battery powered and which can be variable speed. This system, or other variable speed air systems, can be provided or integrated with the disclosed novel depth selector feature for the system by using a rotary switch on the user interface in one non-limiting embodiment. Though not considered limiting, the rotary switch can have 3 positions for maximum depth selections of 15, 25, and 65 feet. Other depth values can be used and all are considered within the scope of the disclosure. The microcontroller of the system can reads voltage on the resistor of the voltage divider created by the rotary switch to determine which position the rotary switch is in. The microcontroller uses this information to set the upper and lower pressure limits for the dive. The upper pressure limit can be defined as the pressure at which the compressor starts to idle, and the lower pressure limit can be defined as the pressure at which the compressor starts to run again. For the shallower depths, the pressure limits are lower.

Efficiency Gains—Lab testing based on 2 divers breathing 1 SCFM at depth listed 1. 15 feet: over 50% more run time than standard algorithm
2. 25 feet: over 30% more run time than standard algorithm
3. 65 feet: negligible gain in run time, though projected to have significant gain in run time for 1 diver application Though not limiting, preferably, the depth selection for the underwater activity can be made before turning the system ON. Once the system is on, the compressor can pulse either 1, 2, or 3 times to indicate which mode the system is in, so the user can verify the indicator on the "Maximum Depth Selector" is correct. Other number of pulses can be provided, particularly if there are more than three selections.

In alternative or additional configurations, a depth sensor can be embedded at or with the diver that sends a signal to the system microcontroller. The microcontroller could then automatically update the pressure limits throughout the dive to adjust for the depth of the diver real-time. The sensor could be on a separate cable or the wires could be run through the air hose. The frequency of signals being sent by the depth sensor can be controlled or configured in the depth sensor or can be based on configuring the frequency or continuous nature of the microcontroller requesting such information from the depth sensor.

Accordingly, in one non-limiting embodiment an improved battery-powered, variable speed, surface air supply system is provided. The battery system can preferably contain a variable speed (VS) technology which allows for minimizing energy demands on the system by enabling the motor to adapt to the breathing patterns of the diver, thus conserving energy and allowing for longer run times. However, even with the VS technology, prior system run times were typically limited to a maximum of 60-75 minutes, which was considered a relatively short period of time when compared to 3+ hours of run time typically experienced with older gas version system.

However, with the addition of the disclosed depth selector a significant extension of run-time for the battery-powered system can be provided, with the possibility of the battery systems now providing as much or nearly as much of run time as a gas version system.

The disclosed novel VS system with depth selector can also use a lithium ion battery as the power source and thus providing for a lighter, yet more powerful battery as compared to prior batteries used for VS systems.

In one non-limiting example, the disclosed VS system with lithium battery and depth selection capabilities, yielded a run time of over three hours and weighed 40% less than earlier systems, such as the VS265 Third Lung offered by Brownie's Marine Group, Inc, which is incorporated by reference herein.

The disclosed novel system uses similar components and features of prior VS systems, and such components are incorporated by reference (i.e. compressor, battery(ies), floats, hoses, regulators, etc.)

Certain non-limiting features or characteristics for the disclosed system may include, without limitation: lithium ion battery, variable speed, max depth selector, battery level indicator, easy loading battery with spring loaded contacts.

In one non-limiting example, the system was able to achieve over 3+ hours of battery life with 2 divers diving to a 65 feet maximum depth and with 3 divers diving to a 35 feet maximum depth.

With the preferred variable speed feature for the system, when the diver breathes less, the compressor pumps less air. When the diver breathes more, the compressor pumps more air. This provides for longer dive times, as the compressor doesn't have to work as hard and thus uses less battery power to operate.

The novel max depth selector can be provided, in one non-limiting version, as a dial at the top of the system and allows the user to select their maximum dive depth for a longer run time especially when used at a smaller depth setting. In one non-limiting embodiment, the depth settings can be 15, 25 and 65 feet, though other values can be chosen and incorporated into the system and all values are considered within the scope of the disclosure. With the selection made preferably before turning the system "on", when the system is turned/switched "on", the compressor can pulse on startup to confirm which option has been selected. In one non-limiting embodiment, one pulse can be made for the 15 feet selection and two pulses made for the 25 feet selection.

The battery can be preferably a lithium ion battery, though other battery types can be used and are considered within the scope of the disclosure.

The disclosed novel system makes it easier to dive for the diver, as compared to other earlier systems. The battery can be easily swapped using a novel spring-loaded contact configuration, which can automatically connect the battery when the battery is placed in a waterproof housing box.

As a non-limiting example, the lithium ion battery can have the following non-limiting features/characteristics: 24V, 63.8 amp-hour, 1531 watt-hour; 18.7 pounds/8.5 kilograms; can charge in about 8-10 hours and can have a cycle life of 500-800.

Use of the disclosed depth selector may also be beneficial for use with older gas surface air supply systems to increase their efficiency, and incorporating the novel depth selector into these systems is also considered within the scope of the disclosure.

It should be understood that the exemplary embodiments described herein should be considered in a descriptive sense only and not for purposes of limitation. Where multiple embodiments are disclosed, descriptions of features or aspects within each embodiment should typically be considered as available for other similar features or aspects in other embodiments. While one or more embodiments have been described with reference to the figures, it is understood that various changes in form and details may be made therein without departing from their spirit and scope and such changes are considered within the scope of the disclosure.

All parts/components of the novel surface air supply system and their locations, wiring, powering means, battery types, mechanical and/or electrical communications between parts/components, attachment or securement mechanisms, dimensions, values, ratings, shapes, materials, data storage, storage, uses, etc. discussed above or shown in the figures, if any, are merely by way of example and are not considered limiting and other component(s) and their locations, wiring, powering means, battery types, mechanical and electrical communications between parts/components, attachment or securement mechanisms, dimensions, values, ratings, shapes, materials, data storage, storage, uses, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the future claims.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the novel surface air supply system and depth selector have been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A depth selector device integrated into a variable speed surface supplied air system for selecting an intended maximum depth for an underwater dive prior to beginning the underwater dive, the air system having a user interface and used by the user to receive air during the underwater dive, comprising:

a rotary switch provided on the user interface and having a plurality of positions, wherein one of the plurality of positions is selected prior to beginning the underwater dive;

a voltage divider in connection with the rotary switch, the voltage divider having a plurality of resistors with each resistor associated with a corresponding one position from the plurality of positions of the rotary switch;

a microcontroller in communication with the voltage divider for reading a current voltage from the voltage divider based on the one position selected for the rotary switch, wherein prior to beginning the underwater dive the microcontroller is configured to use the current voltage information to set an upper pressure limit and a lower pressure limit for the underwater dive.

2. The depth selector of claim 1 wherein the plurality of positions for the rotary switch are three positions for selecting maximum depth.

3. The depth selector of claim 2 wherein the three positions are 15 feet, 25 feet and 65 feet underwater.

4. The depth selector of claim 1 wherein the upper pressure limit is a pressure at which a compressor component of the variable speed surface supplied air system begins to idle and the lower pressure limit is a pressure at which the compressor component begins to run again.

5. The depth selector of claim 1 wherein when the variable speed surface supplied air system is turned on the microcontroller can be configured to cause a compressor component of the air system to pulse a certain number of times depending on the rotary switch position selected to allow a user to verify that the rotary switch position selected is correct.

6. A depth selector device integrated into a variable speed surface supplied air system for selecting an intended maximum depth for an underwater dive prior to beginning the underwater dive, the air system used by the user to receive air during the underwater dive, comprising:
 a manually controlled input device for selecting one from a plurality of diver depth choices prior to beginning the underwater dive; and
 a microcontroller in communication with the manually controlled input device, wherein prior to beginning the underwater dive the microcontroller is configured or programmed to use the selected diver depth choice to set an upper pressure limit and a lower pressure limit for the underwater dive.

7. A depth selector device for use with a variable speed surface supplied air system, comprising:
 a rotary switch having a plurality of positions for selecting one from the plurality of positions prior to beginning the underwater dive;
 a voltage divider in connection with the rotary switch;
 a microcontroller in communication with the voltage divider for reading a current voltage from the voltage divider based on a position selected for the rotary switch, the microcontroller is configured to use the current voltage information to set an upper pressure limit and a lower pressure limit for the underwater dive prior to a user beginning the underwater dive with the variable speed surface supplied air system.

8. The depth selector of claim 7 wherein the plurality of positions for the rotary switch are three positions for selecting maximum depth.

9. The depth selector of claim 8 wherein the three positions are 15 feet, 25 feet and 65 feet underwater.

10. The depth selector of claim 7 wherein the upper pressure limit is a pressure at which a compressor component of the variable speed surface supplied air system begins to idle and the lower pressure limit is a pressure at which the compressor component begins to run again.

11. The depth selector of claim 7 wherein when the variable speed surface supplied air system is turned on the microcontroller can be configured to cause a compressor component of the air system to pulse a certain number of times depending on the rotary switch position selected to allow a user to verify that the rotary switch position selected is correct prior to the user beginning the underwater dive.

12. The depth selected device of claim 7 wherein the voltage divider having a plurality of resistors with each resistor associated with a corresponding one position from the plurality of positions of the rotary switch.

13. The depth selected device of claim 7 wherein input device is a manually controlled input device.

14. The depth selected device of claim 13 wherein the depth selector device allowing a user to manually select an intended maximum depth for an underwater dive prior to beginning the underwater dive.

15. A depth selector device for use with a variable speed surface supplied air system, comprising:
 an input device for selecting one from a plurality of diver depth choices prior to beginning the underwater dive; and
 a microcontroller in communication with the manually controlled input device, the microcontroller configured or programmed to use the selected diver depth information to set an upper pressure limit and a lower pressure limit for the underwater dive prior to a user beginning the underwater dive with the variable speed surface supplied air system.

16. The depth selector device of claim 15 wherein the manually controlled input device is a rotary switch.

17. The depth selected device of claim 15 wherein input device is a manually controlled input device.

18. The depth selected device of claim 16 wherein the depth selector device allowing a user to manually select an intended maximum depth for an underwater dive prior to beginning the underwater dive.

* * * * *